No. 795,178. PATENTED JULY 18, 1905.
G. A. STILES.
EYEGLASSES.
APPLICATION FILED NOV. 1, 1904.
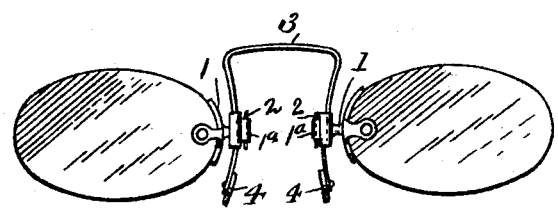
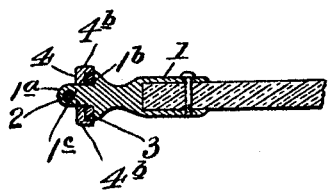
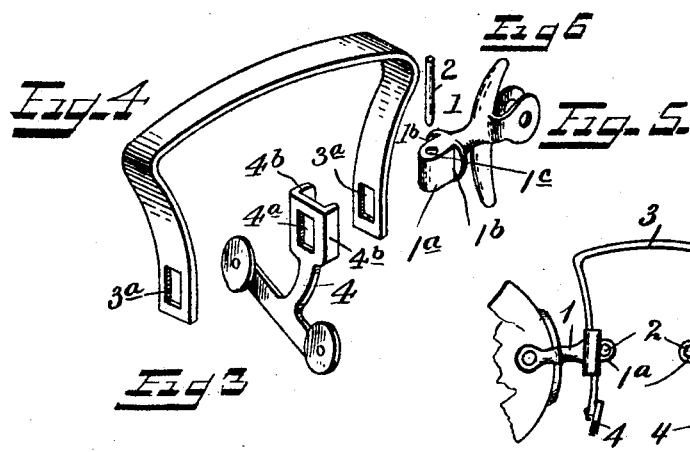
Witnesses:
L. L. Burket.
W. N. Durand.
Inventor.
GEORGE A. STILES:
By Lewis Bagger & Co
Attorneys No. 795,178. Patented July 18, 1905.

UNITED STATES PATENT OFFICE.

GEORGE A. STILES, OF SOMERVILLE, MASSACHUSETTS.

EYEGLASSES.

SPECIFICATION forming part of Letters Patent No. 795,178, dated July 18, 1905.

Application filed November 1, 1904. Serial No. 230,949.

*To all whom it may concern:*

Be it known that I, GEORGE A. STILES, a citizen of the United States, residing at Somerville, in the county of Middlesex and State of Massachusetts, have invented new and useful Improvements in Eyeglasses, of which the following is a specification.

My invention relates to improvements in eyeglasses, more especially the bridge-pieces or connections between the lenses. As differentiating from this class of eyeglasses as heretofore devised, including a patent issued to me, the present invention has for its object, among other things, mainly to dispense with the use of screws and screw-threaded sockets or apertures therefor in connection with the lens-holding studs and to provide an effective fastening between the latter and the bridge-piece or spring.

Said invention consists of the detailed structural features substantially as hereinafter more fully disclosed and particularly pointed out by the claims.

In the accompanying drawings, illustrating the preferred embodiment of my invention, Figure 1 is a view showing it as applied to a pair of lenses. Fig. 2 is a horizontal section produced through a lens-holding stud and its connection, more especially with the bridge or spring. Figs. 3, 4, 5, and 6 are sundry views showing the various parts or members of the invention, respectively, disassembled. Fig. 7 is a view embracing a modification differing from the aforesaid disclosure of the invention simply in the arrangement of the apertured ends or terminals of the lens-bearing studs, permitting the inserting of the securing pins or keys therein transversely or at right angles of the manner of effecting such insertion by the aforesaid disclosure.

In the carrying out of my invention I provide the lens-holding studs 1, otherwise of general outline, each with a rectangular or oblong terminal $1^a$, the essential portion of the contour thereof, however, being that it shall have parallel or right lined lateral surfaces, at the inner edges of which said stud is provided with lateral shoulders $1^b$, the purpose thereof being presently apparent. Said rectangular terminal has a vertical aperture or passage $1^c$ therethrough at its extreme inner end to receive a slightly-downward-tapered pin or key 2, again herein referred to. The bridge or spring 3, also of general construction, is provided near each end with a rectangular slot or aperture $3^a$ to conform to and receive the correspondingly-shaped terminal $1^a$ of each stud 1, effecting a relatively fixed connection therebetween for obvious reasons. The nose guards or bearings 4 are each also provided with a corresponding or rectangular slot or aperture $4^a$ at its extreme upper end, laterally of which are formed vertical flanges $4^b$, said slot or aperture also receiving or permitting the passage therethrough of the angular terminal $1^a$ of a stud 1, while said flanges embrace the bridge or spring 3 at its lower end, reinforcing and producing a very firm connection between these parts as against any possibility of the same becoming loose. The pin or key 2 last of all is inserted into the passage or aperture $1^c$ of the stud-terminal $1^a$, and as it is driven into position will secure the whole in place and effectively prevent displacement thereof, its insertion being limited by its tapering contour.

Thus the use of all screws and screw-threads, as above noted, is obviated in securing together the several parts constituting the connection between the lenses, overcoming the liability of the same working loose and becoming displaced or falling apart.

It will be understood that latitude is allowed as to details herein, as they may be changed as circumstances suggest without departing from the spirit of my invention.

I claim—

1. Eyeglasses, comprising a lens-holding stud having projecting beyond lateral shoulders thereon an angular terminal provided with an aperture extending therethrough, a bridge-piece having an angular slot receiving said terminal, a nose-guard also having said terminal passing through it, and a fastening-pin, said terminal having its apertured portion extending beyond said bridge-piece and guard and said pin inserted into said aperture, with its end portion projecting from said terminal and effective to clamp the several parts in fixed position.

2. Eyeglasses, comprising a lens-holding stud having projecting beyond lateral shoulders an angular terminal provided with an aperture extending therethrough, a bridge-piece having an angular slot, receiving said terminal, a nose-guard also having an angular slot also receiving said terminal, and a securing-pin, said terminal having its apertured portion extending beyond said bridge-piece and nose-guard, and said pin inserted into said aperture, with its end portions projecting from said terminal and effective to clamp said several parts in fixed position.

3. Eyeglasses, employing a lens-holding stud having shoulders thereon and an angular terminal provided with a passage extending through its extreme inner end, a bridge-piece having an angular slot receiving said angular terminal, a nose guard or bearing also having an angular slot also receiving said terminal, and flanges flanking said slot, and embracing said bridge-piece, and a key inserted into said aperture, with its end portions extending from said terminal and effective to clamp said bridge-piece and nose-guard, with said stud, in relatively fixed position.

In testimony whereof I affix my signature in presence of two subscribing witnesses.

GEORGE A. STILES.

Witnesses:
JAS. A. MACDONALD,
F. W. BRUSH.